UNITED STATES PATENT OFFICE.

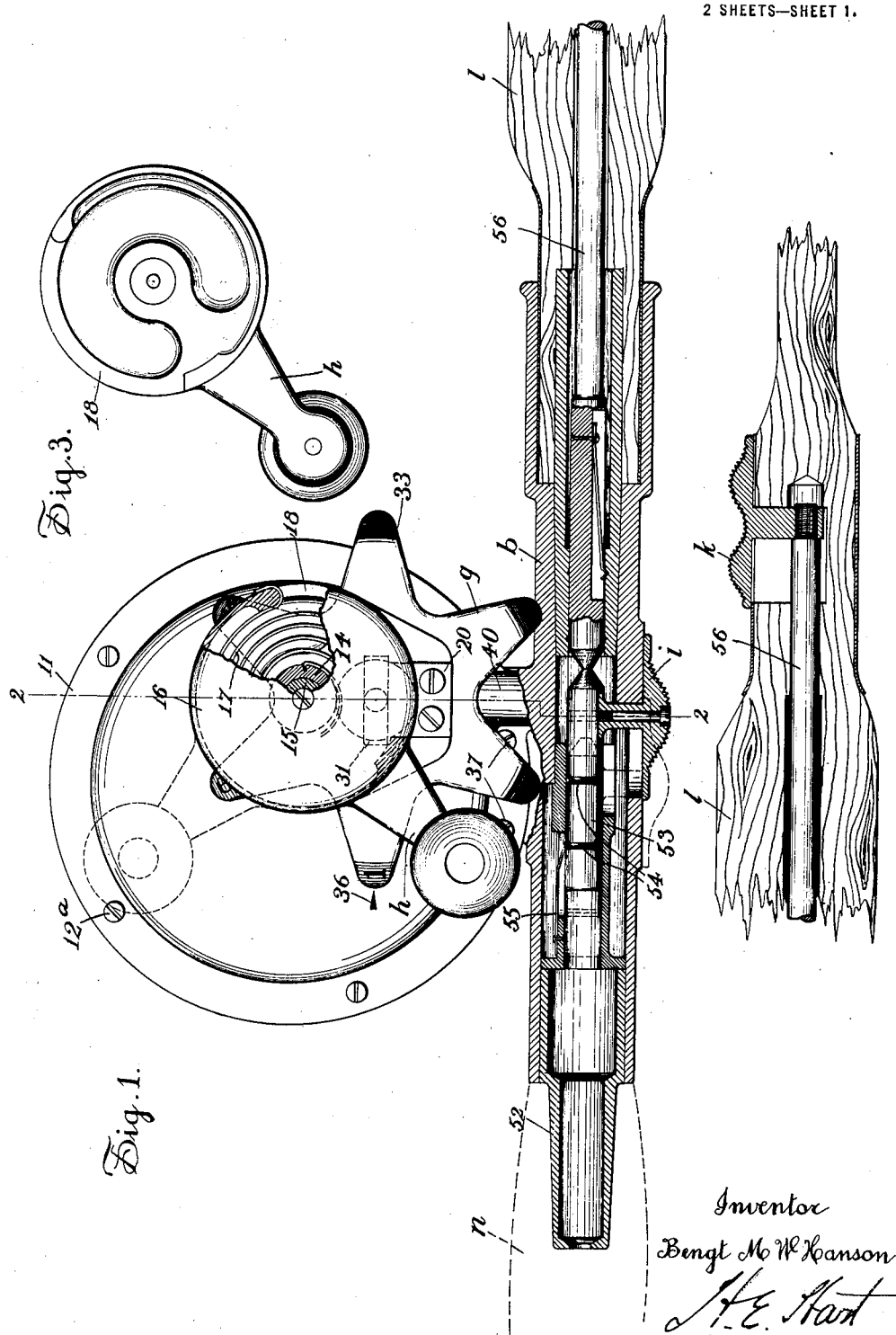

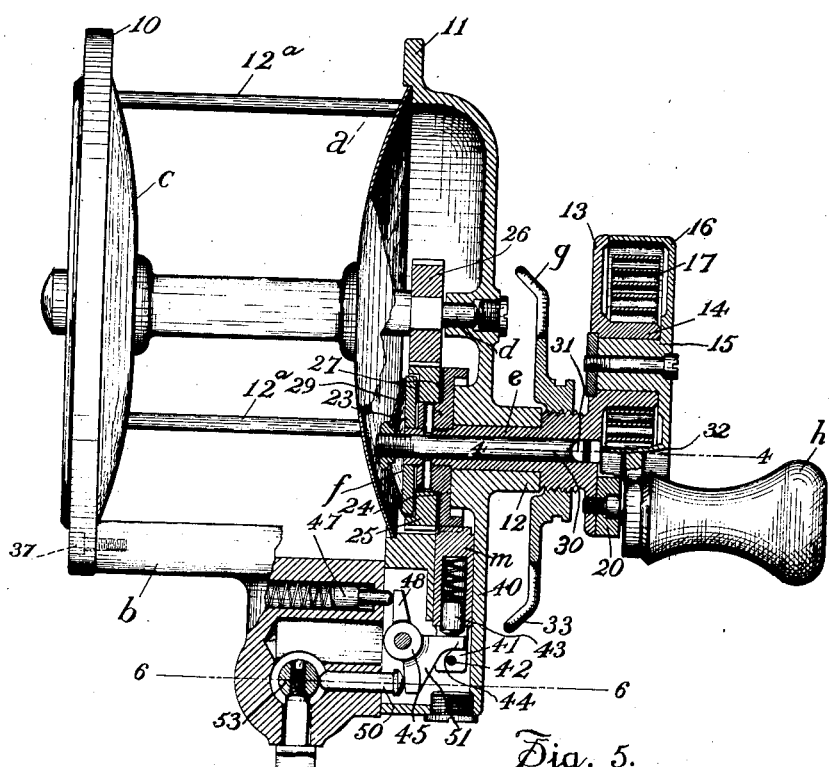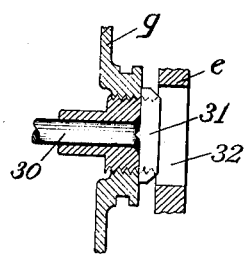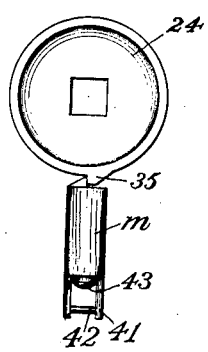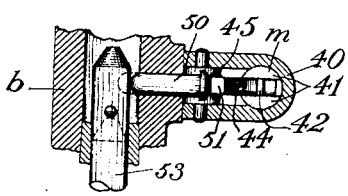

BENGT M. W. HANSON, OF HARTFORD, CONNECTICUT.

FISHING REEL.

1,406,005.

Specification of Letters Patent.   Patented Feb. 7, 1922.

Application filed February 21, 1920.   Serial No. 360,340.

*To all whom it may concern:*

Be it known that I, BENGT M. W. HANSON, a citizen of the United States, and a resident of Hartford, county of Hartford, State of Connecticut, have invented certain new and useful Improvements in a Fishing Reel, of which the following is a specification.

It is the object of the present invention to provide a fishing reel having features of novelty and advantage and particularly to provide a reel which is characterized by its efficiency and the ease with which it may be manipulated.

In the accompanuying drawings, wherein a preferred embodiment of the invention is shown:

Fig. 1 is a side view of the reel, a portion thereof being in longitudinal vertical section.

Fig. 2 is a rear view of the reel, a portion thereof being in vertical transverse section on the line 2—2 of Fig. 1, and the spool spindle being shown in third line projection.

Fig. 3 is an inside view of the crank handle.

Fig. 4 is a detail view taken substantially on line 4—4 of Fig. 2.

Fig. 5 is a detail view, and

Fig. 6 is a sectional view taken on line 6—6 of Fig. 2.

In these drawings, the frame $a$ of the reel is shown as having side plates 10, 11 connected together by cross rods 12$^a$ and secured on the opposite sides of a base $b$ which in this case forms a section of the fishing rod. $c$ denotes generally the spool mounted on a spindle $d$ having its ends carried in suitable bearings on the plates 10, 11; $e$, the operating shaft; $f$, a frictional brake constituting a drive connection between the shaft $e$ and the spindle $d$; $g$, a nut adjustably carried by the shaft $e$ for varying the frictional force of the brake $f$; $h$, the crank handle eccentrically connected to the outer end of the shaft $e$ in a manner to be hereinafter described; $i$ and $k$ thumb pieces carried by the base $b$ and a section $l$ of a rod, and adapted to actuate, in a manner hereinafter described, a stop pin $m$ for preventing, at will, rotation of one of the members of the friction brake $f$ so that the brake will exert a dragging force on the spool spindle $d$.

The shaft $e$, which is mounted in a bearing 12, has at its outer end a plate 13 provided with a hub 14 which is eccentric to the axis of the shaft $e$. Rotatably mounted in the hub 14 is the pivot pin or stud 15 of the crank handle $h$. At its pivoted end the crank handle is in the form of a circular shell 16 which, together with the plate 13, forms a housing for a helical spring 17, one end of which is fixed to the hub 14 and the other end attached in some convenient manner to the shell 16 of the crank handle $h$, the spring thus forming a driving connection between the handle and the operating shaft $e$. The spring is sufficiently stiff so that under ordinary conditions it will transmit motion from the crank handle $h$ to the operating shaft $e$ without distortion. But in a case where the drag on the line is heavy or increases, the operation of the crank handle distorts the spring and permits the crank handle to turn about its own axis to a limited extent, thus increasing the leverage of the crank handle relative to the operating shaft $e$. This is clearly indicated in Fig. 1 where the full line representation of the crank handle knob indicates the normal position of the crank relative to the operating shaft $e$, and the dotted line position of the knob indicates its position under unusual strains. The extent of the eccentric motion of the crank handle relative to the operating shaft is limited as by providing a block 20 fixed to the plate 13 and against which stops on the shell 16 may contact. As illustrated, the method of attaching the end of the spring to the shell 16 is by hooking it about the edge of a notch 18 in the periphery of the shell, and the ends of this notch may cooperate with the block 20 to form the stops above described to limit the motion of the crank handle $h$. This all means that when reeling in the line, the power of the crank handle increases proportionally to the pull exerted on the line by the fish. If but a slight force is necessary to reel in the fish, the crank handle $h$ will swing little, or not at all, about its own axis. If the fish is pulling with great force, the crank handle will swing about its own axis into the position indicated by dotted lines in Fig. 1. The spring connection between the crank handle and the operating shaft is also of advantage in that, should the fish suddenly give a lunge while the operator is rotating the handle, the spring 17 will take up, to a great extent, the shock to which the hand of the operator would otherwise be subjected, and which shock in some instances might, but for the spring, have been of such severity as to cause the handle to fly out of the hand of the operator resulting in the loss of the fish.

The brake *f* has a pair of friction disks 23, 24 fast on the inner end of the shaft *e* and these disks frictionally grip between them a gear 25 meshing with a gear 26 fixed to the spool spindle *d*. If desired, fiber washers 27 may be interposed between the frictional disks and the gear 25. The friction disk 23 may move longitudinally of the shaft *e* and is urged against the friction gear 25 by means of a spring 29 secured by a nut at the end of a T head shifting pin 30 extending longitudinally through the shaft *e* and having its T head 31 positioned in a diametrical slot 32 in the outer end of the shaft *e* (see Fig. 4). The pin 30 is adjusted longitudinally of the shaft *e*, so as to vary the frictional force of the brake *f*, by means of the adjustable nut *g*, the outer face of which abuts against the projecting ends of the T head 31. This nut is preferably in the form of a star wheel having a plurality of arms 33 consecutively numbered.

The complementary threads between the nut *g* and the shaft *e* are such that the nut *g* can be rotated but one complete rotation during which the shifting pin 30 will be moved longitudinally from one extreme to the other. As will be readily seen from Fig. 5, the disk 24 has on its periphery a single notch or abutment 35 with which the stop pin *m* cooperates to prevent rotation of the disk when it is desired to apply a dragging force on the spool. The crank handle *h* may, however, be operated to reel the line on to the spool. Since the disc 24 has but a single abutment, the shaft *e*, when the stop pin *m* is thrown into operation, will always stop at the same angular position. As the arms 33 of the nut *g* are consecutively numbered, the operator, by noting the position of these arms relative to a fixed index line 36, may at a glance determine the amount of drag which the brake is exerting on the spool *c*.

The side plates 10, 11 of the frame *a* of the reel are secured in any suitable manner as by means of the screws 37 to the opposite sides of the base *b* which forms a section of the rod. With this arrangement, the reel cannot become loose or become unfastened from the rod. This base has at one end a male plug 52 adapted to be received by the socket in the butt end section *n* of the rod. The base at its forward end has a socket adapted to receive the rear end of the section *l* of the rod.

The stop pin *m*, which is positioned in a hollow boss 40 on the plate 11, has a pair of depending ears 41 connected by a pin 42. Within the stop pin *m* is a spring pressed plunger 43 acting against an arm 44 on a stop lever 45 pivoted (as shown in Fig. 6) in the hollow boss 40. A spring pressed plunger 47 cooperating with an arm 48 of the lever 45 urges this lever in the direction to bring the arm 44 against the pin 42 and thereby lower the stop pin *m*. Mounted in a radial opening in the base *b* is a push pin 50 the outer end of which engages against a third arm 51 of the lever 45. The inner end of this push pin is in the path of a rod 53 mounted in the bore of the base *b* and adapted to be moved longitudinally by the thumb piece *i*. The forward end of this rod 53 is of conical shape so that when it is moved into the full line position of Fig. 1, the push pin 50 will be forced outwardly, thereby raising the arm 44 of the lever 45 and through the spring pressed plunger 43 moving the stop pin *m* into locking engagement with the disk 24. When the rod 53 is retracted to the dotted line position, Fig. 1, the push pin 50 is free to move inwardly, and under the influence of the spring pressed plunger 47, the lever 45 will be rocked so that the arm 44 thereof will engage the pin 42 and move the stop pin *m* out of engagement with the disk 24. The rod 53 has a pair of grooves 54 in which engages the outer end of the spring 55 so that the bar is held in either of its positions against accidental displacement. If desired, a rod 56, similar generally to the rod 53, and adapted to be actuated by the hand holding the rod section *l* may be provided. The thumb piece *k* is secured to the forward end of this rod 56. It is of advantage to have the thumb pieces *i*, *k* carried by the rod, rather than by the frame of the reel, for the reason that the operator may move these thumb pieces without removing either hand from the fishing rod.

Click mechanism may be provided on the side plate 10 of the reel frame for permitting the spool *c* to run free, but as such mechanisms are old and well known, it is deemed unnecessary to illustrate and describe the same.

It is of course obvious that my invention is susceptible of various modifications and changes which are within the spirit of the invention without departing from the scope of the following claims, it being understood that the present disclosure of my invention is by way of illustration only and it is not to be taken as restrictive of my conception.

I claim as my invention:—

1. In a fishing reel, a spool and its spindle, an operating shaft connected thereto, a crank handle eccentrically and pivotally connected to said shaft, a helical spring connected at its opposite ends to said shaft and crank handle, and a stop for limiting rotation of said handle about its own axis.

2. In a fishing reel, a spool, a friction brake therefor and including a disk having a single abutment on its periphery, a stop pin cooperating with said abutment to prevent rotation of said disk in one direction, and means for varying the dragging force of said brake on said spool and including an adjustable nut having a plurality of consecutively numbered indicating arms.

3. In a fishing reel, a spool, a friction brake therefor and including a friction disk having a single abutment on its periphery, a stop pin adapted to cooperate with said abutment to prevent rotation of said disk in one direction, and means for varying the dragging force of said brake on said spool and including an adjustable nut having but one complete revolution and provided with a plurality of consecutively numbered indicating arms.

4. In a fishing reel, a spool, a shaft, a friction brake on said shaft and adapted to exert a dragging force on said spool, said brake including a disk fast on the shaft and having a single abutment on its periphery, a stop pin cooperating with said abutment for preventing rotation of said disk and shaft in one direction, means for varying the dragging force of said friction brake which includes a pin movable longitudinally in said shaft, and an adjustable nut threaded on said shaft and capable of but one complete revolution, said nut having consecutively numbered indicating arms.

5. In a fishing reel, a base constituting a section of a fishing rod, a frame secured to said base, a spool in said frame, means externally of said base and mounted in said frame for rotating said spool, means carried by said frame for exerting a dragging force on said spool, and means on said base for actuating said last mentioned means.

6. In a fishing reel, a base forming a section of the fishing rod, a reel frame having side plates connected to opposite sides of said base, a spool carried by said frame, means mounted in said frame for rotating said spool, means mounted in one of said side plates for exerting a dragging force on said spool, and a thumb piece on said base for actuating said last mentioned means.

7. In a fishing reel, a spool and its spindle, an operating shaft connected thereto and having at its outer end a plate provided with a hub eccentric to the axis of said shaft, a crank handle having a shell pivotally connected to said hub, a helical spring positioned between said shell and plate and having its opposite ends respectively attached thereto, and cooperating stops on said plate and shell for limiting relative rotary movement therebetween.

8. A fishing rod including a pair of sections detachably connected together, a reel frame connected to one of said sections, a spool in said frame, means for rotating said spool, means for exerting a dragging force on said spool and a thumb piece on each section for actuating said last mentioned means.

BENGT M. W. HANSON.